Aug. 12, 1924.

D. A. SMITH, JR
EMERGENCY RIM
Filed Oct. 31, 1923

1,504,649

2 Sheets-Sheet 1

Daniel Arthur Smith Jr.
INVENTOR
BY Victor J. Evans
ATTORNEY

WITNESS:

Aug. 12, 1924.
D. A. SMITH, JR
EMERGENCY RIM
Filed Oct. 31, 1923
1,504,649
2 Sheets—Sheet 2
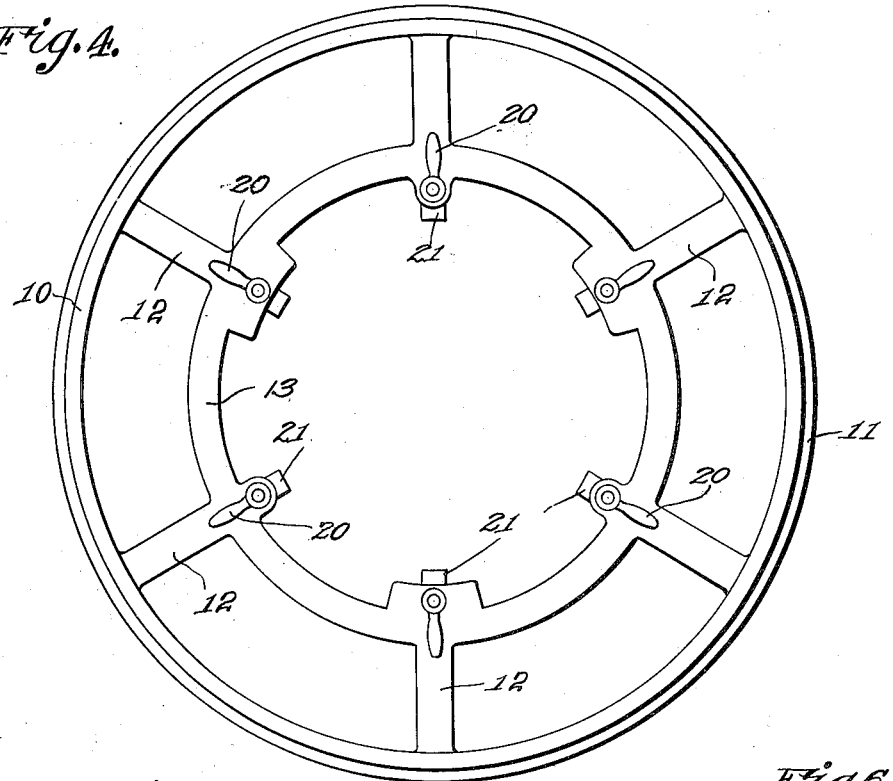
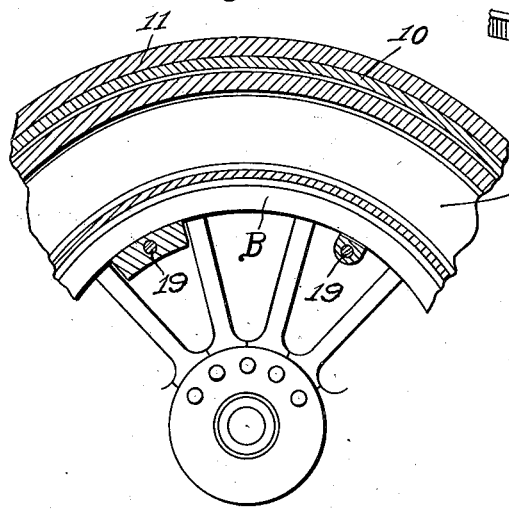
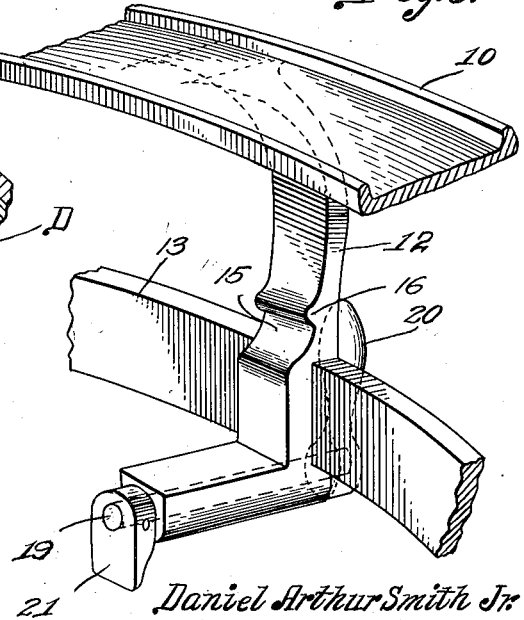
Daniel Arthur Smith Jr.
INVENTOR
BY Victor J. Evans
ATTORNEY
WITNESS:

Patented Aug. 12, 1924.

1,504,649

UNITED STATES PATENT OFFICE.

DANIEL ARTHUR SMITH, JR., OF WILMINGTON, DELAWARE.

EMERGENCY RIM.

Application filed October 31, 1923. Serial No. 671,998.

*To all whom it may concern:*

Be it known that I, DANIEL ARTHUR SMITH, Jr., a citizen of the United States, residing at Wilmington, in the county of New Castle and State of Delaware, have invented new and useful Improvements in Emergency Rims, of which the following is a specification.

This invention relates to vehicle wheels, particularly to attachments therefor, and has for its object the provision of a novel emergency rim adapted to be mounted upon the regular wheel in case of deflation of the tire carried thereby, the emergency device serving as a temporary wheel which will permit operation of the vehicle without injury to the deflated tire, the device being of great advantage in preventing rim cutting of tires as is bound to occur if they are run while flat.

An important object is the provision of a rim of this character which is provided with novel means for clamping it upon the rim of the ordinary wheel so that the weight of the vehicle will be properly sustained without bringing undue strain upon the spokes or other parts thereof.

Still another object is the provision of an emergency rim which is of a skeleton like construction whereby it will have the least weight while possessing sufficient strength and rigidity to withstand the shocks and jars incident to road travel.

An additional object is the provision of an attachment of this character which will be simple and inexpensive in manufacture, easy to apply, positive in action, efficient and durable in service and a general improvement in the art.

Figure 1:
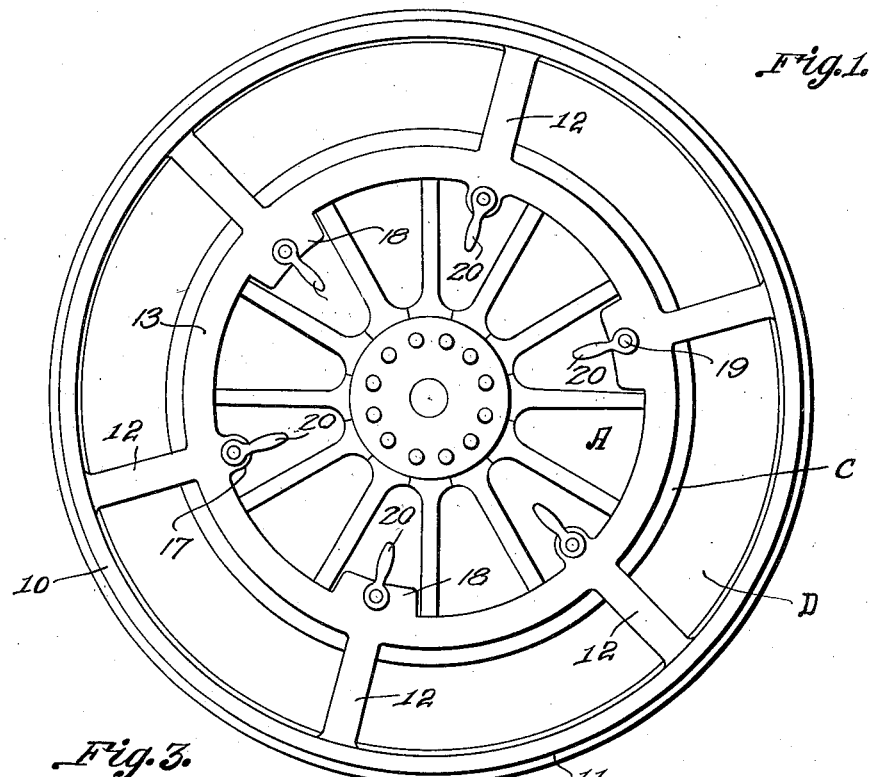
Figure 3:
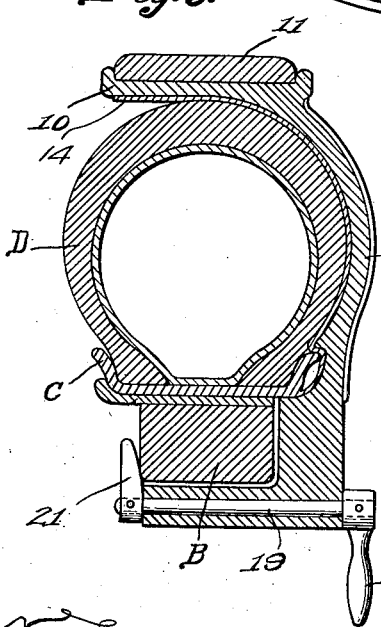
Figure 2:
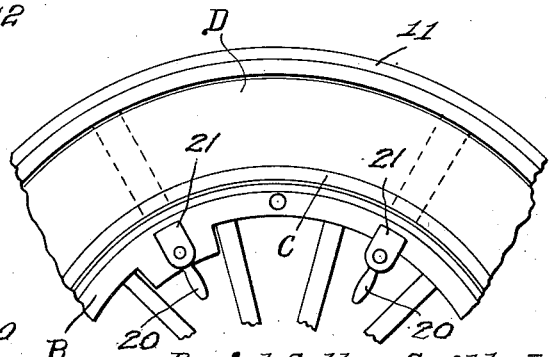

With the above and other objects and advantages in view the invention consists in the details of construction to be hereinafter more fully described and claimed and illustrated in the accompanying drawings, in which:

Figure 1 is a side elevation looking at the outside of a vehicle wheel equipped with my attachment, Figure 2 is a fragmentary elevation of the opposite side, Figure 3 is a cross section, Figure 4 is an elevation of the device detached, Figure 5 is a section taken circumferentially of the wheel and showing the position of the lugs and clamps, Figure 6 is a perspective view of a portion of the device showing one of the clamps.

Referring more particularly to the drawings the letter A designates an ordinary vehicle wheel which is here shown as being of the spoke or artillery type and which includes the usual felly B and rim C upon which is mounted the pneumatic tire D.

In carrying out my invention I provide a ring like body 10 of slightly greater diameter than the tire so as to be capable of disposition in surrounding relation thereto. This body is constructed of steel or iron and has its outer or tread surface provided with a comparatively thin tread strip 11 of rubber. Formed upon or secured to the ring like body 10 are radial spokes 12 which extend toward the center of the wheel and which are connected with or formed upon a side ring 13. It is preferable that these elements be coated with rubber indicated at 14 so as to avoid chafing the tire or the wheel. At the points where they come opposite the rim the spokes 12 are recessed at 15 so that the inner faces will lie flat against the felly. The spokes are curved so as to conform substantially to the shape of the tire. The formation of the recesses defines shoulders 16 which extend over the flange of the rim for holding the device in place.

Projecting inwardly from the ring 13 are lugs 17 and 18 which extend transversely of the wheel felly at the inner periphery thereof and which are of a length to terminate slightly short of the far side of the felly. The lugs 17 are comparatively narrow while the lugs 18 are wide and fit between successive spokes whereby to provide a driving connection which will prevent circumferential movement of the attachment with respect to the wheel.

For clamping the device upon a wheel, I provide a plurality of clamps which include shanks 19 rotatable through the lugs 17 and 18 and equipped at one end with handles 20. At their other ends these shanks carry wedge members 21 which are adapted to have their inclined faces jambed against the far side of the felly for preventing the attachment from lateral displacement from the wheel.

In use, in case of a flat tire, the operator places the attachment against a wheel with the ring or rim 10 in embracing relation to the tire and with the lugs 17 and 18 disposed between successive spokes. The engagement of the shoulder 16 with the flange of the rim C will center the device properly so that it cannot become displaced radially of the wheel. The handles 20 are then grasped and then turned so as to extend toward the center of the wheel as indicated in Figure 1 whereupon the wedges 21 will jamb against the far side of the felly and hold the device against lateral displacement.

From the foregoing description and a study of the drawings it will be apparent that I have thus provided a simply constructed and consequently inexpensive emergency device which is of equal if not more advantage than a spare tire inasmuch as it is not capable of being punctured and may always be kept ready for application to any wheel having a deflated tire thereon. The device is easy to put on and take off and while not intended for great speed or hard usage is entirely adequate to enable the motorist to drive to a repair station. The attachment is easier to apply than a spare tire and it should therefore recommend itself to those seeking to avoid the annoyance of tire trouble.

While I have shown and described the preferred embodiment of my invention it is of course to be understood that I reserve the right to make such changes in the form, construction and arrangement of parts as will not depart from the spirit of the invention or the scope of the subjoined claims.

I claim:

1. An emergency rim comprising a member adapted to be disposed over and about a deflated tire, inwardly extending spokes carried by said rim, lugs at the inner ends of said spokes adapted for disposition between the spokes of the wheel and means for holding the attachment against lateral displacement with respect to the wheel.

2. An emergency rim comprising a member adapted to be disposed over and about a deflated tire, inwardly extending spokes carried by said rim, lugs at the inner ends of said spokes adapted for disposition between the spokes of the wheel and means for holding the attachment against lateral displacement with respect to the wheel, comprising movably mounted wedge members permanently carried by the device and engageable with the far side of the wheel felly for effecting a locking action.

3. An emergency rim comprising a member adapted to be disposed over and about a deflated tire, inwardly extending spokes carried by said rim, lugs at the inner ends of said spokes adapted for disposition between the spokes of the wheel and means for holding the attachment against lateral displacement with respect to the wheel, said means comprising clamping members each formed as a shank journally mounted and provided at one end with a handle and at its other end with a laterally extended lug having a wedge face, said shanks being disposed transversely with respect to the wheel.

4. An emergency rim comprising a member adapted for disposition over and about a deflated tire, inwardly extending spokes carried by said rim and connected by a ring member, said spokes being shaped for substantially conforming engagement against the tire and felly, said spokes being recessed to define shoulders engaging against the outer edge of one side flange of the rim to hold the device centered with respect to the wheel, and means for holding the device against lateral displacement with respect to the wheel.

5. A device of the character described comprising a rim adapted for engagement over and about a deflated tire on a wheel, inwardly extending spokes carried by said rim and connected by a ring, means for centering the device with respect to the wheel, means for clamping the device against lateral displacement with respect to the wheel, and a driving connection including a plurality of lugs carried by said ring member and extending transversely of the felly against the inner periphery thereof.

In testimony whereof I affix my signature.

DANIEL ARTHUR SMITH, Jr.